(12) United States Patent
Seo et al.

(10) Patent No.: US 12,206,110 B2
(45) Date of Patent: Jan. 21, 2025

(54) CATHODE MATERIAL FOR SULFIDE-BASED ALL-SOLID-STATE BATTERIES, MANUFACTURING METHOD THEREOF, AND ALL-SOLID-STATE BATTERY USING THE SAME

(71) Applicants: HYUNDAI MOTOR COMPANY, Seoul (KR); KIA CORPORATION, Seoul (KR)

(72) Inventors: Im Sul Seo, Jincheon-gun (KR); Sang Heon Lee, Yongin-si (KR); Sung Woo Noh, Seoul (KR); Jeong Hyun Seo, Daejeon (KR); Chung Bum Lim, Suwon-si (KR); Ju Yeong Seong, Seongnam-si (KR); Je Sik Park, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 74 days.

(21) Appl. No.: 18/082,264

(22) Filed: Dec. 15, 2022

(65) Prior Publication Data

US 2023/0369588 A1 Nov. 16, 2023

(30) Foreign Application Priority Data

May 12, 2022 (KR) ........................ 10-2022-0058479

(51) Int. Cl.
*H01M 4/58* (2010.01)
*C01B 25/45* (2006.01)
*H01M 4/02* (2006.01)

(52) U.S. Cl.
CPC .......... *H01M 4/5825* (2013.01); *C01B 25/45* (2013.01); *C01P 2002/50* (2013.01);
(Continued)

(58) Field of Classification Search
None
See application file for complete search history.

(56) References Cited

U.S. PATENT DOCUMENTS 8,313,719 B2 11/2012 Barker et al.
2011/0210288 A1* 9/2011 Barker .................. C01B 25/455
252/182.1

(Continued)

FOREIGN PATENT DOCUMENTS

JP 2013-084565 A 5/2013
JP 2014-123559 A 7/2014
(Continued)

OTHER PUBLICATIONS

English translation of Yanagida et al. (JP 2019/164986). (Year: 2019).*

(Continued)

*Primary Examiner* — Ronak C Patel
(74) *Attorney, Agent, or Firm* — MCDONNELL BOEHNEN HULBERT & BERGHOFF LLP

(57) ABSTRACT

A cathode material for sulfide-based all-solid-state batteries, in which $Li_3V_2(PO_4)_3$ (LVP) is doped with a transition metal having an oxidation number of +5 or more and the surface of the cathode material is substituted with a halogen element so as to have improved surface stability and energy density and to suppress side reactions with a solid electrolyte, a manufacturing method thereof, and an all-solid-state battery using the same.

6 Claims, 6 Drawing Sheets

(52) U.S. Cl.
CPC ...... *C01P 2004/02* (2013.01); *C01P 2004/50* (2013.01); *C01P 2004/61* (2013.01); *C01P 2004/62* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2020/0091518 A1 | 3/2020 | Tsukada |
| 2020/0091522 A1 | 3/2020 | Ito et al. |

FOREIGN PATENT DOCUMENTS

| | | |
|---|---|---|
| JP | 2020-149964 A | 9/2020 |
| KR | 2013-0035911 A | 4/2013 |

OTHER PUBLICATIONS

English translation of Kanno et al. (JP 2020/0149964). (Year: 2020).*

Xia, Ao, et al., "Synthesis and electrochemical properties of W-doped Li3V2(PO4)3C cathode materials for lithium ion batteries," Ceramics International 40 (2014) 14845-14850.

Zhu, DongZhi, et al., "High performance of Bi3+ and Cl-co-doped Li3V2(PO4)3 as cathode for lithium-ion batteries," Surface Innovations, vol. 8 Issue 5, 2020.

* cited by examiner

CATHODE MATERIAL FOR SULFIDE-BASED ALL-SOLID-STATE BATTERIES, MANUFACTURING METHOD THEREOF, AND ALL-SOLID-STATE BATTERY USING THE SAME

CROSS REFERENCE TO RELATED APPLICATIONS

This application claims under 35 U.S.C. § 119(a) the benefit of priority to Korean Patent Application No. 10-2022-0058479 filed on May 12, 2022, the entire contents of which are incorporated herein by reference.

BACKGROUND

(a) Technical Field

The present disclosure relates to a cathode material for sulfide-based all-solid-state batteries, a manufacturing method thereof, and an all-solid-state battery using the same. More particularly, the disclosure relates to a cathode material for sulfide-based all-solid-state batteries, in which $Li_3V_2(PO_4)_3$ (LVP) is doped with a transition metal having an oxidation number of +5 or more and the surface of the cathode material is substituted with a halogen element so as to have improved surface stability and energy density and to suppress side reactions with a solid electrolyte, a manufacturing method thereof, and an all-solid-state battery using the same.

(b) Background Art $Li_3V_{2-y}My(PO_4)_3$ (LVP) used as a cathode material which is capable of exhibiting high capacity and high voltage based on high ion conductivity and surface stability at a solid-liquid interface in a lithium ion battery (LIB).

In order to commercialize LVP, it is necessary to secure output characteristics and, for this purpose, Korean Patent Laid-open Publication No. 10-2013-0035911 suggests technologies that form microparticles (having a diameter of 2.5 µm or less) and coat the surfaces of the microparticles with carbon. However, conventionally, when LVP is applied to a sulfide-based all-solid-state battery (ASB), the all-solid-state battery is seriously degraded due to side reactions of a sulphate and increase in interfacial resistance at a solid (sulfide-based solid electrolyte)-solid (LVP) interface, and thus, it is difficult to use LVP as a cathode material of the all-solid-state battery. Therefore, in order to solve such a problem, a reforming design of a cathode material for sulfide-based all-solid-state batteries, which is differentiated from the conventional cathode material, is required.

The present disclosure is to suppress side reactions and to implement a level of performance of an all-solid-state battery equivalent to the performance of a lithium ion battery (LIB) through reforming of the crystal structure (core/surface) of $Li_3V_2(PO_4)_3$.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art, and it is an object of the present disclosure to provide a cathode material for all-solid-state batteries which has improved capacity, surface stability and energy density, and suppresses side reactions with a solid electrolyte.

In one aspect, the present disclosure may provide a cathode material for all-solid-state batteries including a compound represented by Chemical Formula 1, $$Li_aV_{2-x}Me_x(PO_4)_yA_z,\qquad \text{Chemical Formula 1}$$

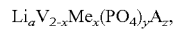

wherein Me may include one selected from the group consisting of tungsten (W), niobium (Nb), tantalum (Ta), molybdenum (Mo) and combinations thereof, A may include one selected from the group consisting of fluorine (F), chlorine (Cl), bromine (Br) and combinations thereof, and $2.0 < a \le 3.5$, $0 < x \le 2.0$, $3.0 < y \le 3.5$, and $0 < z \le 1$.

In one embodiment, M may include tungsten (W), A may be chlorine (Cl), and $2.8 < a \le 3.2$, $0 < x \le 0.5$, and $0 < z \le 0.5$.

In another embodiment, a ratio of Li/(V+Me) in the compound may be about 1.4 to 1.8.

In still another embodiment, the compound may include at least one from the group consisting of a primary particle, a secondary particle, and combinations thereof, the primary particle may include a single particle, and the secondary particle may include an agglomerate of the primary particles.

In yet another embodiment, the primary particle may have an average particle diameter ($D_{50}$) of about 0.5 µm to 10 µm and the secondary particle may have an average particle diameter ($D_{50}$) of about 1 µm to 20 µm.

In another aspect, the present disclosure provides a manufacturing method of a cathode material for all-solid-state batteries, the manufacturing method including preparing a mixture including a lithium (Li) precursor, a vanadium (V) precursor and a Me precursor, stirring the mixture, firing stirred mixture and making it into a pellet, primarily calcining the pellet, substituting a surface of a calcined result with an A precursor to obtain an intermediate, and secondarily calcining the intermediate.

In one embodiment, a ratio of the Li precursor/(the V precursor+the Me precursor) may be 1.4 to 1.8.

In another embodiment, the stirred mixture may be fired at a temperature of about 300° C. to 500° C. for about 4 hours to 8 hours in an atmosphere, and may be pressed at a pressure of about 20 MPa to 50 MPa.

In still another embodiment, the pellet may be primarily calcined at a temperature of about 500° C. to 1,000° C. for about 5 hours to 24 hours in an argon atmosphere.

In yet another aspect, the present disclosure provides a cathode for all-solid-state batteries including the above cathode material for all-solid-state batteries.

In still another aspect, the present disclosure provides an all-solid-state battery including the above cathode for all-solid-state batteries.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limiting of the present disclosure, and wherein.

Figure 1:
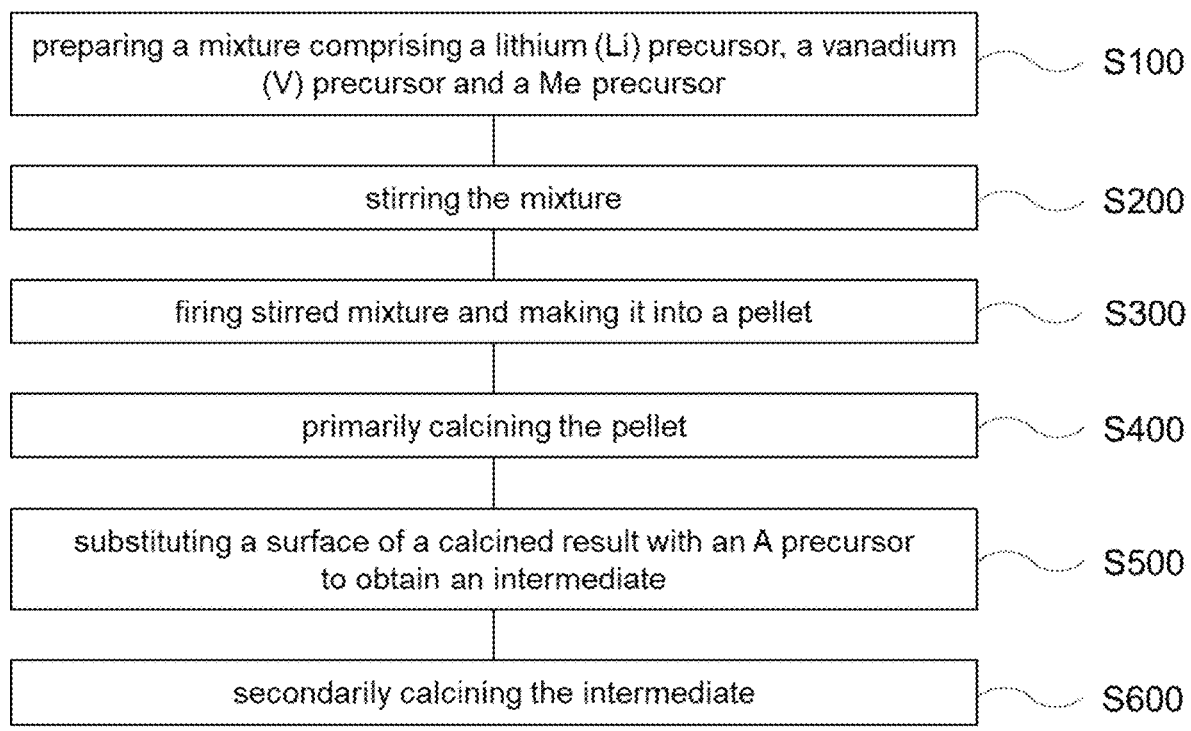
FIG. 1 shows a manufacturing method of a cathode material for all-solid-state batteries according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above-described objects, other objects, advantages and features of the present disclosure will become apparent from the descriptions of embodiments given hereinbelow with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the following description of the embodiments, the same elements are denoted by the same reference numerals even when they are depicted in different drawings. In the drawings, the dimensions of structures may be exaggerated compared to the actual dimensions thereof, for clarity of description. In the following description of the embodiments, terms, such as "first" and "second", may be used to describe various elements but do not limit the elements. These terms are used only to distinguish one element from other elements. For example, a first element may be named a second element, and similarly, a second element may be named a first element, without departing from the scope and spirit of the disclosure. Singular expressions may encompass plural expressions, unless they have clearly different contextual meanings.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between the two parts. In the same manner, it will be understood that, when a part, such as a layer, a film, a region or a plate, is said to be "under" another part, the part may be located "directly under" the other part or other parts may be interposed between the two parts.

All numbers, values and/or expressions representing amounts of components, reaction conditions, polymer compositions and blends used in the description are approximations in which various uncertainties in measurement generated when these values are acquired from essentially different things are reflected and thus it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

A cathode material for all-solid-state batteries according to the present disclosure may include a compound represented by Chemical Formula 1.

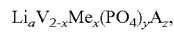
<div align="right">Chemical Formula 1</div>

$Li_aV_{2-x}Me_x(PO_4)_yA_z$

Here, a may satisfy the relation of 2.0<a<3.5, and more concretely, the relation of 2.8<a<3.2.

Compared to the conventional cathode material, in the cathode material for all-solid-state batteries according to the present disclosure, when the number of Li ions in the crystal structure of the cathode material increases, the numerical increase in reversible Li ions contributing to charge and discharge of an all-solid-state battery may increase the charge and discharge capacities of the all-solid-state battery.

Me indicates an element selected the group consisting of transition metals having a high oxidation number of +5 or more without being limited to a specific kind, and, for example, may be one selected from the group consisting of tungsten (W), niobium (Nb), tantalum (Ta), molybdenum (Mo) and combinations thereof, and concretely, may be tungsten (W)

In Chemical Formula 1, x may satisfy the relation of $0<x\le2.0$, and more concretely, the relation of $0<x\le0.5$.

When an element having an oxidation number close to or lower than the oxidation number (+3) of vanadium (V) is used as Me, it is difficult to expect increase in the mole fraction of anions.

Therefore, the cathode material for all-solid-state batteries according to the present disclosure may increase the mole fraction of anions through doping with a transition metal having an oxidation number of +5 or more so as to secure structural stability of the compound, and may have increased particle strength and density so as to improve energy density.

In Chemical Formula 1, y may satisfy the relation of $3.0<y\le3.5$.

$(PO_4)_y$ having strong covalent bonds increases the mole fraction of $(PO_4)$ compared to $Li_3V_2(PO_4)_3$ (LVP) ($y\le3$) used in the conventional cathode material for all-solid-state batteries, thereby being capable of increasing stability of the surface structure of the compound. This suppresses side reactions of a sulphate on the surface of the compound, and thus improves electrochemical characteristics of the compound on the whole and suppresses degradation of the all-solid-state battery using the cathode material according to time.

A indicates an element serving as a substituent used to stabilize the surface of the compound without being limited to a specific kind, and, for example, may be one of halogen elements, and concretely, may be chlorine (Cl).

In Chemical Formula 1 z may satisfy the relation of $0<z\le1$.

In the present disclosure, Li, P and Cl are the same as elements in LiPSCl used as a solid electrolyte except for S, and may thus match with the solid electrolyte, thereby suppressing side reactions with the solid electrolyte.

Therefore, the cathode material for all-solid-state batteries according to the present disclosure may improve surface stability and suppress side reactions with the solid electrolyte through anion substitution.

When a, x, y and z deviate from the above-described ranges, respectively, decrease in the capacity of the all-solid-state battery due to increase in resistance may occur in common.

The ratio of Li/(V+Me) of the compound may be 1.4 to 1.8.

In the present disclosure, a primary particle means single particles, i.e., primary structures, and a secondary particle means an agglomerate of the primary particle, i.e., secondary structures, by physical or chemical bonding between the primary particle without an intentional agglomerate or assembly process.

The compound may include the primary particle which are single particles.

The compound may include polycrystalline secondary particles formed by aggregating the primary particles, or may include both the primary particles and the secondary particles.

The median particle diameter ($D_{50}$) of the primary particles which are single particles may be 0.5 μm to 10 μm, and the median particle diameter ($D_{50}$) of the secondary particles may be 1 μm to 20 μm.

The cathode material for all-solid-state batteries according to the present disclosure may be used independently without blending with other cathode materials.

Hereinafter, a manufacturing method of the cathode material for all-solid-state batteries will be described in detail.

FIG. 1 is a flowchart representing the manufacturing method of the cathode material for all-solid-state batteries according to the present disclosure. Referring to FIG. 1, the manufacturing method of the cathode material for all-solid-state batteries according to the present disclosure may include preparing a mixture including a lithium (Li) precursor, a vanadium (V) precursor and a Me precursor at S100, stirring the mixture at S200, firing stirred mixture and making it into a pellet at S300, primarily calcining the pellet at S400, substituting a surface of a calcined result with an A precursor to obtain an intermediate at S500, and secondarily calcining the intermediate at S600.

In preparing of the mixture including the lithium (Li) precursor, the vanadium (V) precursor and the Me precursor (S100), citric acid may be additionally mixed.

The lithium (Li) precursor may be, for example, $LiH_2PO_4$, without being limited to a specific kind.

The vanadium (V) precursor may be, for example, $NH_4VO_3$, without being limited to a specific kind.

Me may be, for example, tungsten (W), and the Me precursor may be, for example, $WO_3$, without being limited to a specific kind.

The ratio of the lithium (Li) precursor/(the vanadium (V) precursor+the Me precursor) may be 1.4 to 1.8.

This ratio means increase in the proportion of phosphate in the lithium (Li) precursor and, when the ratio deviates from the above range, it may be difficult to synthesize a desired $Li_3V_2(PO_4)_3$-based single phase, and lithium ion conductivity may be rapidly reduced due to formation of an impurity phase having a composition different from a desired composition, and may thus cause degradation of general electrochemical characteristics, such as initial capacity, initial efficiency, rate characteristics, lifespan, etc.

In stirring of the mixture (S200), distilled water may be used as a solvent, and the mixture may be stirred at a temperature of 100° C. to 200° C. for 10 hours to 15 hours in the atmosphere.

The ratio of the mixture to the solvent may be 1:5 to 15.

In firing of the stirred mixture and making the mixture into pellets (S300), the stirred mixture may be fired at a temperature of 300° C. to 500° C. for 4 hours to 8 hours in the atmosphere, and may be pressed at a pressure of 20 MPa to 50 MPa.

In primary calcining of the pellets (S400), the pellets may be calcined at a temperature of 500° C. to 1,000° C. for 5 hours to 24 hours in the Ar atmosphere.

The ratio of the lithium (Li) precursor/(the vanadium (V) precursor+the Me precursor) may be 1.4 to 1.8, and firing of the stirred mixture and making the mixture into the pellets (S300) and primary calcining of the pellets (S400) may be executed under conditions in which single particles may be formed, and thereby, single particles, and more particularly, single particles having a median particle diameter ($D_{50}$) of 0.5 μm to 10 μm, may be grown as primary particles in these operations (S300 and S400).

The A precursor may be, for example, $WCl_6$ or $WI_6$, without being limited to a specific kind.

In secondary calcining of the result (S600), the result may be calcined at a temperature of 500° C. to 700° C. for 5 hours to 8 hours in the Ar atmosphere.

A cathode for all-solid-state batteries according to the present disclosure may include the cathode material for all-solid-state batteries according to the present disclosure.

An all-solid-state battery according to the present disclosure may include the cathode for all-solid-state batteries according to the present disclosure.

Hereinafter, the present disclosure will be described in more detail through the following examples. The following examples serve merely to exemplarily describe the present disclosure, and are not intended to limit the scope.

Manufacturing Example: Examples 1 to 4 and Comparative Examples 1 and 2

Comparative Examples 1 and 2: Application of Conventional $Li_3V_2(PO_4)_3$ to LIB and ASB $Li_3V_2(PO_4)_3$, which was used as the conventional cathode material, was applied to a lithium ion battery (LIB) and an all-solid-state battery (ASB), respectively. After 20 wt % of citric acid was mixed to 57 wt % of $LiH_2PO_4$ and 43 wt % of $NH_4VO_3$ as main raw materials, 10 wt % of distilled water based on solids was put thereinto, and an acquired mixture was stirred at a temperature of 150° C. for 12 hours. Thereafter, the stirred mixture was fired at a temperature of 400° C. for 6 hours in the atmosphere, and was then primarily calcined at a temperature of 900° C. for 10 hours in the Ar atmosphere, an acquired result was ground and filtered so as to manufacture $Li_3V_2(PO_4)_3$, and $Li_3V_2(PO_4)_3$ was applied to the LIB and the ASB.

Example 1: Doping of Raw Materials Used in Comparative Example 1 with 0.2 Mol W

A cathode material was manufactured in the same manner as in Comparative Example 1 except that 8.5 wt % of $WO_3$ (a W raw material) was added when the raw materials used in Comparative Example 1 were mixed. The cathode material was applied to an ASB.

Example 2: Conversion from $(PO_4)_3$ to $(PO_4)_{3.2}$

A cathode material was manufactured in the same manner as in Example 1 except that the amount of $LiH_2PO_4$ was increased 62 wt % (i.e., Li/V+W ratio=1.8) when the raw materials used in Example 1 were mixed. The cathode material was applied to an ASB.

Example 3: Coating with 0.1 mol Cl

A cathode material was manufactured in the same manner as in Example 2 except that, after primarily calcining the stirred mixture, 1.2 wt % of $WCL_6$ (a W raw material) was added, an acquired mixture was made into pellets, the pellets were secondarily calcined at a temperature of 600° C. for 6 hours in the Ar atmosphere, and an acquired result was ground and filtered. The cathode material was applied to an ASB.

Example 4: Growth of Single Particles Having Diameter 5 μm (Including Primary Calcination)

A cathode material was manufactured by mixing the same raw materials as in Example 2, firing an acquired mixture, making the mixture into pellets at a pressure of 500 MPa, primarily calculating the pellets at a temperature of 500° C. to 1,000° C. for 5 hours to 24 hours in the Ar atmosphere, secondarily calcining the pellets in the same manner as in Example 3, and grinding and filtering an acquired result.

Test Example 1: Difference in Particle Shapes (SEM Image Analysis)

Figure 2A:
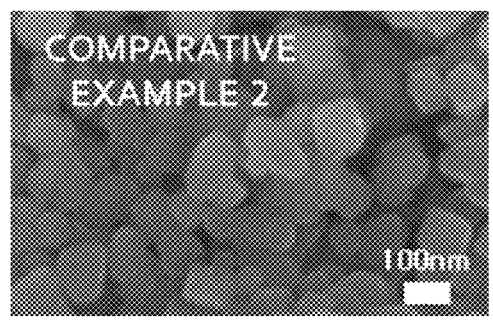
FIG. 2A shows a particle shape according to Comparative Example 2.
Figure 2B:
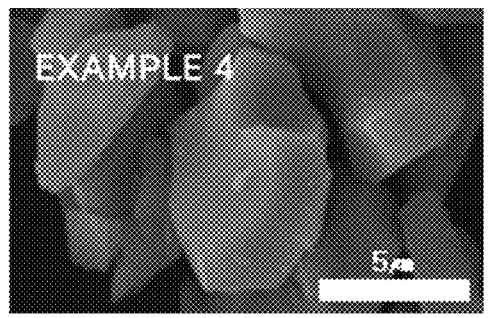
FIG. 2B shows a particle shape according to Example 4.

FIG. 2A is an SEM image showing the particle shape of the cathode material according to Comparative Example 2. FIG. 2B is an SEM image showing the particle shape of the cathode material according to Example 4. Referring to FIGS. 2A and 2B, FIG. 2A shows the morphology of $Li_3V_2(PO_4)_3$, used as the conventional cathode material for LIBs. The median particle diameter ($D_{50}$) of $Li_3V_2(PO_4)_3$ is controlled to be equal to or less than 100 nm so as to improve reactivity with a liquid electrolyte and, when $Li_3V_2(PO_4)_3$ is applied to an ASB, $Li_3V_2(PO_4)_3$ is disadvantageous to formation of an interface with a solid electrolyte and has remarkably low particle density and particle strength, and thus, it is difficult to use $Li_3V_2(PO_4)_3$ as a cathode material for ASBs having a high energy density. In order to solve these problems, in the present disclosure, single particles having a median particle diameter ($D_{50}$) of 5 μm, as shown in FIG. 2B, were synthesized through adjustment of the Li/Me ratio, calcination of the pellets, and stepwise calcination. Such morphology of the cathode material according to the present disclosure may have improved particle density and particle strength so as to exhibit physical characteristics appropriate for a cathode material for ASBs requiring a high pressure, and may easily form an interface with the solid electrolyte so as to improve electrochemical characteristics through suppression of interfacial resistance.

Test Example 2: Comparison of Effects

Tests for comparing the effects of cells manufactured using the cathode materials according to Comparative Examples 1 and 2 and Examples 1 to 4 were performed.
Results of the tests are set forth in Table 1 below.

Evaluation Method

Capacity: initial capacity under charge/discharge capacities of 0.1 C/0.1 C
Lifespan: capacity retention after 50 cycles under charge/discharge capacities of 0.5 C/0.5 C
Energy density: capacity of 0.1 C (mAh/g)×average voltage (V)×pellet density (g/cc)
Particle strength: breaking strength of one particle when the particle is compressed

TABLE 1

| Category | Chemical formula | Capacity [mAh/g] | Lifespan [%/50$^{th}$] | Energy density [kWh/L] | Particle strength [MPa] |
| --- | --- | --- | --- | --- | --- |
| Comp. example 1 | $Li_3V_2(PO_4)_3$ (in LIB) | 169 | 85% | 1.62 | 88 |
| Comp. example 2 | $Li_3V_2(PO_4)_3$ (in ASB) | 77 | 9% | 0.61 | 88 |
| Example 1 | $Li_3V_{1.8}W_{0.2}(PO_4)_3$ | 95 | 45% | 0.91 | 114 |
| Example 2 | $Li_3V_{1.8}W_{0.2}(PO_4)_{3.2}$ | 147 | 72% | 1.59 | 129 |
| Example 3 | $Li_3V_{1.8}W_{0.2}(PO_4)_{3.2}Cl_{0.1}$ | 162 | 80% | 1.86 | 133 |
| Example 4 | $Li_3V_{1.8}W_{0.2}(PO_4)_{3.2}Cl_{0.1}$ 5 μm single particle | 166 | 83% | 2.11 | 152 |

Figure 3:
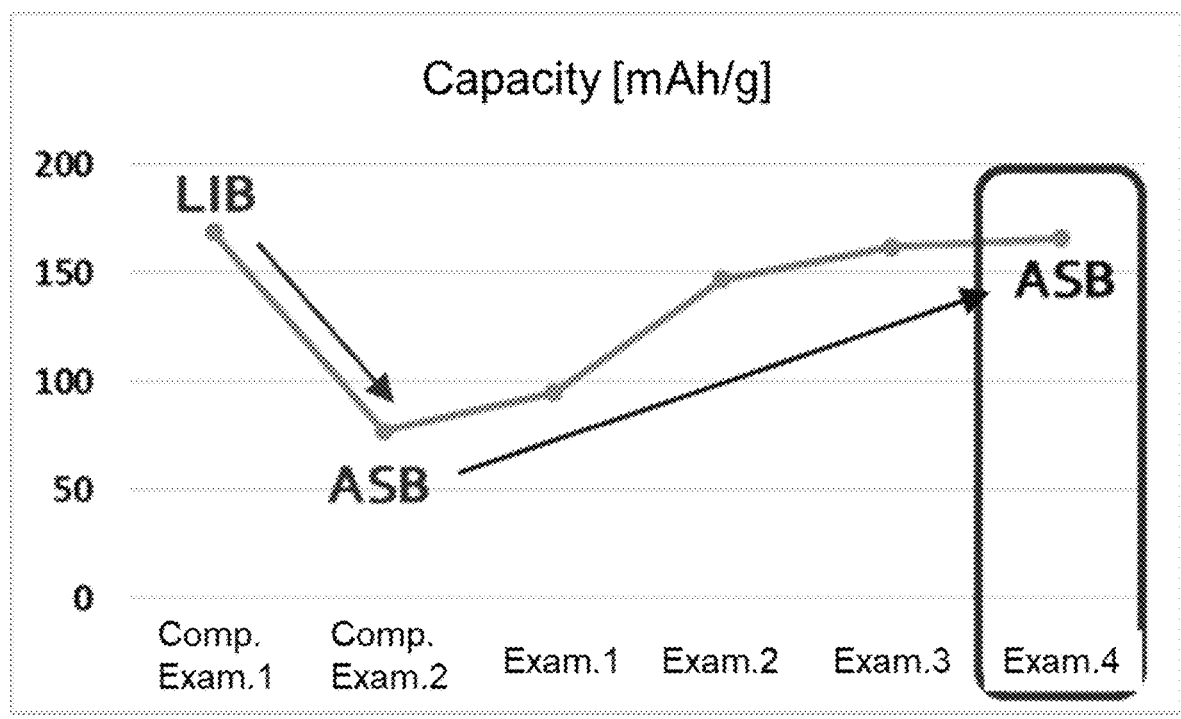
FIG. 3 shows capacities of batteries according to Comparative Examples and Examples.
Figure 4:
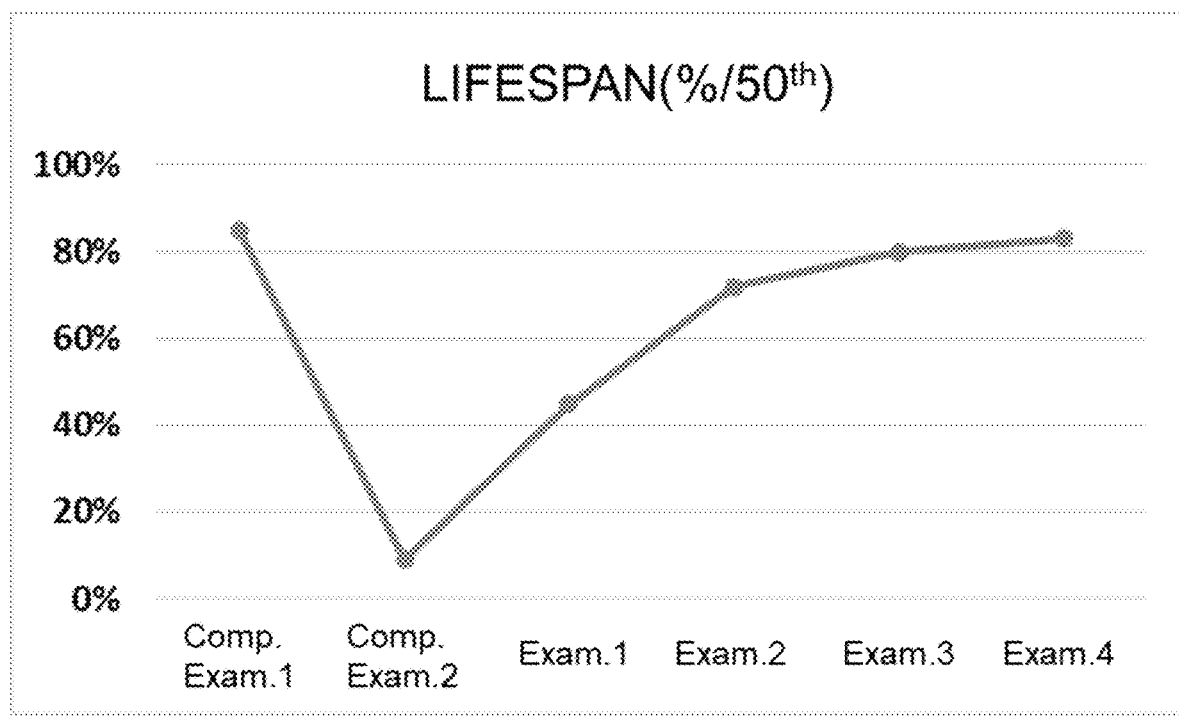
FIG. 4 shows lifespans of the batteries according to Comparative Examples and Examples.
Figure 5:
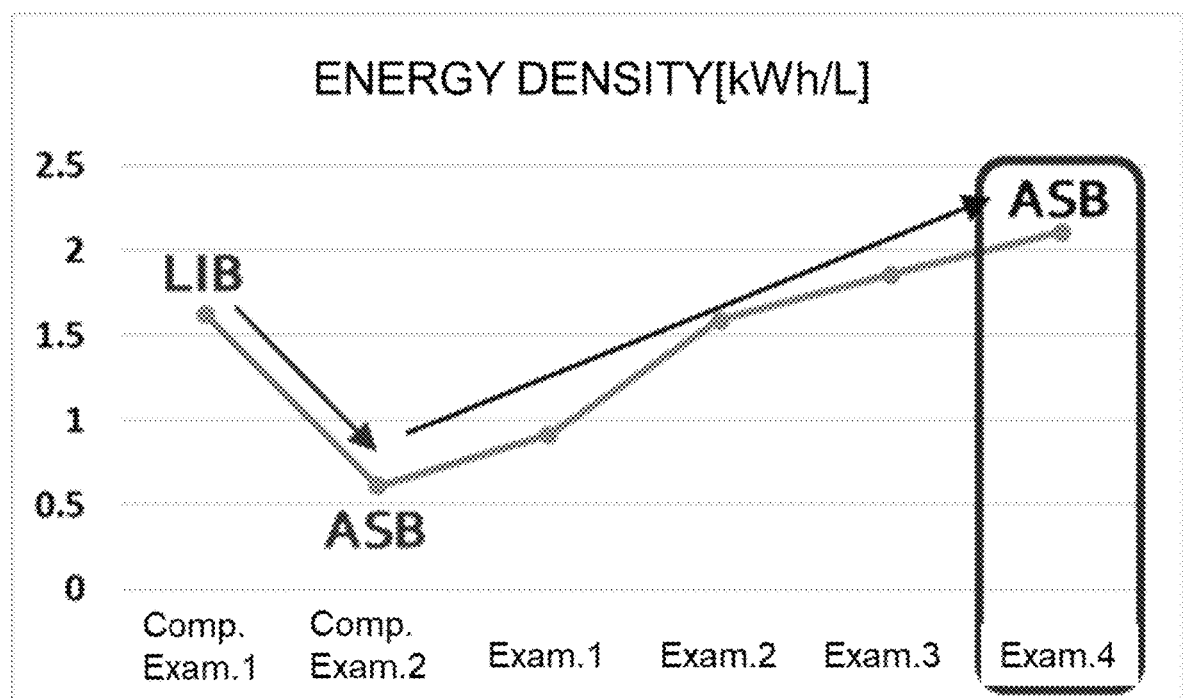
FIG. 5 shows energy densities of the batteries according to Comparative Examples and Examples.
Figure 6:
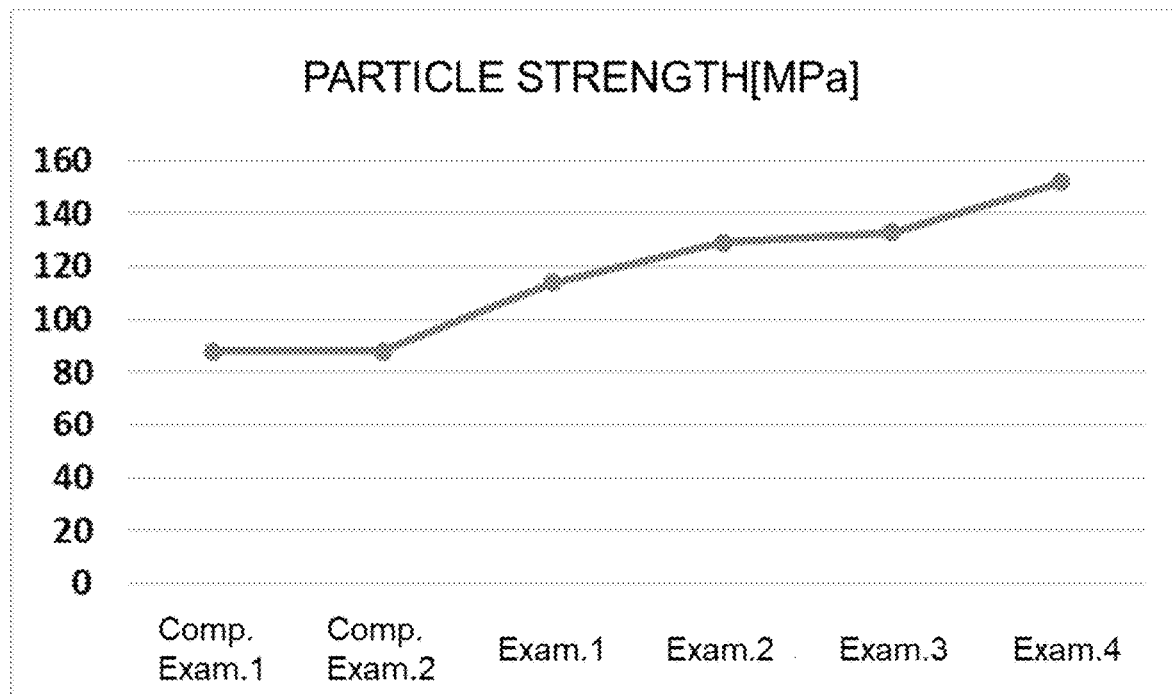
FIG. 6 shows particle strengths of cathode materials according to Comparative Examples and Examples.

FIG. 3 is a graph comparatively representing capacities of the batteries according to Comparative Examples and Examples. FIG. 4 is a graph comparatively representing lifespans of the batteries according to Comparative Examples and Examples. FIG. 5 is a graph comparatively representing energy densities of the batteries according to Comparative Examples and Examples. FIG. 6 is a graph comparatively representing particle strengths of the cathode materials according to Comparative Examples and Examples.

Referring to FIGS. 3 to 6 and Table 1, it may be confirmed from the results of the lithium ion battery and the all-solid-state battery using the conventional LVP material according to Comparative Example 1 and Comparative Example 2 that, when the conventional LVP material was applied to the all-solid-state battery, the capacity, lifespan and energy density of the all-solid-state battery were remarkably reduced, and the density and particle strength of the cathode material were remarkably low due to porous aggregation of primary particles having a diameter of 2 μm or less.

Therefore, in the present disclosure, in order to solve the above problems, the cathode material according to Example 1 was configured to be doped with tungsten (W), the cathode material according to Example 2 was configured to increase the proportion of ($PO_4$), the cathode material according to Example 3 was configured such that the surface thereof was substituted with $Cl^-$ ions, and the cathode material according to Example 4 was configured such that single particles were grown. It may be confirmed from the results of the all-solid-state batteries according to Examples 1 to 4 that all of the capacity, lifespan, energy density and particle strength of $Li_3V_2(PO_4)_3$ (LVP) including single particles were improved.

Therefore, the cathode material for all-solid-state batteries according to the present disclosure is configured such that $Li_3V_2(PO_4)_3$ (LVP) is doped with a transition metal having an oxidation number of +5 or more and the surface of the cathode material is substituted with a halogen element, and may thus implement a capacity and a lifespan equivalent to those of a lithium ion battery and achieve improved energy density and particle strength, thereby being capable of increasing the possibility of applying an LVP cathode material to a sulfide-based all-solid-state battery.

As is apparent from the above description, a cathode material for all-solid-state batteries according to the present disclosure may have improved surface stability and energy density.

Further, the cathode material for all-solid-state batteries according to the present disclosure may suppress side reactions with a solid electrolyte.

The disclosure has been described in detail with reference to preferred embodiments thereof. However, it will be appreciated by those skilled in the art that changes may be made in these embodiments without departing from the principles and spirit of the disclosure, the scope of which is defined in the appended claims and their equivalents.

The invention claimed is:

1. A cathode material for all-solid-state batteries comprising a compound represented by:

$$Li_aV_{2-x}Me_x(PO_4)_yA_z,$$

wherein:
Me comprises one selected from the group consisting of tungsten (W), niobium (Nb), tantalum (Ta), molybdenum (Mo) and combinations thereof;
A comprises one selected from the group consisting of fluorine (F), chlorine (Cl), bromine (Br) and combinations thereof; and $$2.0<a\leq3.5,\ 0<x\leq2.0,\ 3.2\leq y\leq3.5,\ \text{and}\ 0<z\leq1;$$

wherein a molar ratio of Li to a sum of V and Me in the compound is about 1.4 to 1.8.

2. The cathode material for all-solid-state batteries of claim 1, wherein:
Me comprises tungsten (W);
A comprises chlorine (Cl); and $$2.8<a\leq3.2,\ 0<x\leq0.5,\ \text{and}\ 0<z\leq0.5.$$

3. The cathode material for all-solid-state batteries of claim 1, wherein the compound comprises at least one from the group consisting of a primary particle, a secondary particle, and combinations thereof;
the primary particle comprises a single particle; and
the secondary particle comprises an agglomerate of the primary particles.

4. The cathode material for all-solid-state batteries of claim 3, wherein the primary particle has an average particle diameter ($D_{50}$) of about 0.5 μm to 10 μm, and the secondary particle has an average particle diameter ($D_{50}$) of about 1 μm to 20 μm.

5. A cathode for an all-solid-state battery comprising the cathode material of claim 1.

6. An all-solid-state battery comprising the cathode of claim 5.

* * * * *